United States Patent Office 3,401,015
Patented Sept. 10, 1968

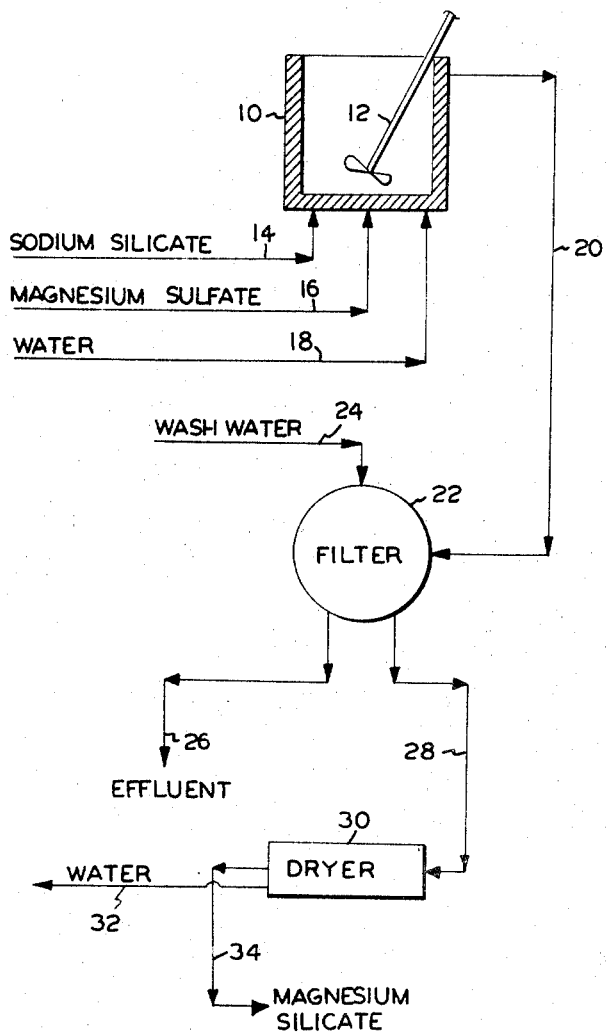

3,401,015
MAGNESIUM SILICATE AND PROCESS
FOR MAKING SAME
Fred C. Ninger, Livingston, Arthur J. Sikora, Bernardsville, and Herbert T. Snyder, Morris Plains, N.J., assignors to Warner-Lambert Pharmaceutical Company, Morris Plains, N.J., a corporation of Delaware
Filed Apr. 15, 1965, Ser. No. 448,319
4 Claims. (Cl. 23—110)

This invention relates to a novel method for the production of magnesium silicate for use in therapeutic preparations. More particularly, the present invention relates to a continuous method for the preparation of magnesium silicate by the interaction of a magnesium salt and an alkali metal silicate in an aqueous reaction medium under carefully controlled reaction conditions.

Magnesium silicate is a well-known compound which has found great use in pharmaceutical preparations. Drugs containing magnesium silicate have proven to be among the most satisfactory acid adsorbents available for medical use. Magnesium silicate is also characterized as having excellent acid binding properties and is highly effective when taken orally for the treatment of gastric hyperacidity, for relief of pain of peptic ulcers and the like.

Although the literature on the wet reaction between magnesium sulfate (or chloride) and sodium (or potassium) silicate extends as far back as 1839 (Dobereiner: "Analyse und Synthese des Meerschaums"), frequently the materials and the experimental procedures employed by previous workers for the production of various silicates of magnesium by means of this reaction are vaguely, if at all, described.

It has been proposed heretofore to produce magnesium silicates by reacting an alkali metal silicate with a water-soluble salt of magnesium, or by reacting an alkali metal silicate with a water-soluble calcium salt and converting the resulting calcium silicate to magnesium silicate by treatment with a water-soluble magnesium salt. A further well-known method is by treatment of naturally-occurring calcium silicates with a water-soluble salt of magnesium or by the treatment of magnesium basic carbonate with silica, water, and alkali at elevated temperature and pressure. For example, a method for preparing a series of magnesium silicates by the interaction of a magnesium salt and an alkali metal silicate is disclosed by Roseman et al. in U.S. Pat. No. 2,384,563. The synthetic magnesium silicates so produced have a MgOiSiO2 molecular ratio of 1:3.1 to 1:4.3 and are disclosed as being useful in the formulation of preparations employed for the treatment of peptic ulcers as well as anti-digestives, antacids, as weight-reducing agents, dentifrices, chewing gums, etc. The physical characteristics of these magnesium silicates are such, however, that purification to an acceptable level is difficult. A related method for preparing magnesium silicate adsorbents may also be found in the teaching of U.S. Patent No. 2,434,418.

It has now been found that by maintaining carefully controlled reaction conditions in an aqueous reaction system comprising a water-soluble magnesium salt and a soluble alkali metal silicate results in the preparation of magnesium silicate having substantially improved characteristics and in particular, improved acid-consuming capacity over magnesium silicates prepared heretofore. In addition, the process of the present invention is readily adaptable to continuous processing and thereby affords an improved method for preparing magnesium silicate, especially since the process of the present invention has great flexibility and commercial adaptability resulting in the lowering of the cost of producing highly active forms of magnesium silicate for use in pharmaceutical preparations. The present invention also provides the data needed for determining the proportions of reactants required to produce magnesium silicate in the range of about 1.2:1 to about 1.3:1 and so represents a considerable advance over the prior state of the art.

It is, therefore, an important object of this invention to provide an improved method for the production of magnesium silicate which enables the latter to be obtained in high purity and suitable for use in pharmaceutical compositions with a minimum of processing steps.

It is a further object of this invention to provide a method for the continuous preparation of magnesium silicate having improved characteristics and especially useful as a constituent in pharmaceutical preparations employed for the treatment of gastric hyperacidity, peptic ulcers, and the like.

These and other objects and advantages will appear from the following detailed description taken in combination with the process flow diagram illustrated in the drawing.

In accordance with this invention, magnesium silicate may be prepared by reacting a magnesium salt with an alkali metal silicate in an aqueous reaction medium such as reaction vessel 10 having stirring rod 12 therein of the process flow diagram illustrated in the drawing. Preferably sodium silicate is added to the reaction vessel by line 14 at a rate of about 1.60 to about 1.70 pounds per minute in about an 8–12% by weight solution while simultaneously, magnesium sulfate is added to the reaction vessel by line 16 in an amount from about 0.8 to about 1.0 pound per minute in about a 20–25% by weight solution along with water which is added by line 18 at a rate of about 0.9 to about 1.0 pound per minute. Conveniently, the reactor is maintained at a temperature from about 65° to about 75° C. and a pH from about 8 to about 10. The stirring rod 12 is rotated at any desirable rate such as, for example, 1,000 r.p.m.

The sodium silicate added to the reaction vessel by line 14 desirably has a $Na_2O:SiO_2$ ratio of from about 1.0:1 to about 1.2:1.

The reaction slurry is withdrawn from reaction vessel 10 by line 20 at a rate of about 3.40 to about 3.60 pounds per minute and is introduced in a suitable filter unit 22 which is desirably a rotating drum filter adapted for continuous processing of the slurry. Prior to filtration, the slurry is desirably diluted with water at a dilution rate of about 1.5 to about 2.5 gallons of water per minute. Conveniently, the temperature of the diluted material being processed in the filter is maintained at about 65° C. to about 75° C. Wash water is added to the filter by line 24 at a rate such as about 2 gallons per minute maintained desirably at a temperature of about 90° C. Excess water is removed from filter 22 by process line 26 as the effluent.

Wet filter cake is removed from filter 22 by process line 28 at a convenient rate such as, for example, from about 0.7 to about 0.8 pound per minute and preferably at a rate of about 0.72 pound per minute. The material is next introduced into dryer 30 from which water is desirably removed by process line 32 at a rate of about 0.4 to about 0.6 pound per minute such that the magnesium silicate removed by line 34 has from about 75 to about 85% water loss. Magnesium silicate is rmoved from the dryer at a rate such that the processed magnesium silicate has a $SiO_2:MgO$ ratio of from about 1.20:1 to about 1.30:1 with a water content of from about 20% to about 35%. Preferably, the water content is in the area of about 30% by weight.

The reaction involved in the described process may be typically illustrated by the following equation:

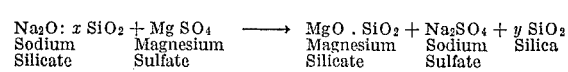

wherein $x$ and $y$ depend upon the type silica fed into the processing system.

After the magnesium silicate has been filtered and dried, the prepared cake discharged from the dryer may then be used in tablets, granulations and the like or the magnesium silicate may be added directly as a constituent of a liquid antacid preparation. When the magnesium silicate prepared herein is to be incorporated in a liquid antacid preparation, it may be maintained in the form of a wet filter cake washed with a somewhat greater volume of wash water per pound of product than when the magnesium silicate is dried for use in dry granulation or tablet form.

When the magnesium silicate obtained as described above is processed to the dry form, a fine, white, odorless powder is found to result which is free from grittiness.

The sodium silicate employed in the present process should have a $Na_2O:SiO_2$ weight ratio of from about 1.0:1 to about 1.2:1. Commercially available sodium silicates having the desired $Na_2O:SiO_2$ ratio may be employed in carrying out the process of the present invention. Sodium silicates produced by the treatment of silica or other silicious minerals with sodium hydroxide, peroxide, or carbonate may also be used. For example, materials containing alkali metal silicates produced by fusing fuller's earth, bentonite, or other naturally occurring silicates, with sodium carbonate, or by treating such naturally occurring silicates with sodium hydroxide at elevated temperatures may be satisfactorily employed.

In order to further illustrate the preferred method of practicing the present invention, the following is given by way of example.

EXAMPLE 1.63 pounds per minute of sodium silicate solution having 10.7% by weight solids and a $Na_2O:SiO_2$ ratio of 1.02:1 is added to a reactor along with 0.9 pound per minute of magnesium sulfate solution having 20.1% solids by weight, and 1.0 pound per minute water at a temperature of about 60° C. The temperature of the reaction mixture is maintained at about 70° and a pH of about 9.0. A stirring rod suspended in the reactor is rotated at about 1,000 r.p.m. to suitably provide a medium vortex and insure complete mixing of the reactants. The resultant slurry is continually overflowed at a rate of about 3.53 pounds per minute and the overflow is pumped to a filter trough where it is diluted with 1.5 gallons per minute of water. The slurry is continually washed on the filter drum with about 2 gallons per minute of water maintained at a temperature of about 90° C. The washed cake is removed from the filter at a rate of about 0.720 pound per minute and is then dried at about 155° C. in a suitable dryer. The dried cake is screened to a fine powder capable of passing through a 140 mesh screen and added as a constituent to an antacid preparation. This dried powder may then be formed into tablets with other materials such as calcium carbonate, sodium bicarbonate, magnesium ammonium phosphate, oil of peppermint and saccharin if desired. The amount of magnesium silicate included in such tablets may vary from about 0.3 to about 0.5 gram per 1 gram tablet.

The products containing magnesium silicate as prepared herein are found to have great use in the treatment of hyperacidity, in peptic ulcer therapy, and as an adsorbent vitamin, hormones, dyes, and many other compounds.

It is understood that the foregoing detailed description is given merely by way of illustration and that many variations may be made therein without departing from the spirit of the present invention.

What is claimed is:

1. A method for the continuous preparation of magnesium silicate having a $MgO:SiO_2$ ratio of about 1.2:1 to about 1.3:1 which comprises continuously reacting magnesium sulfate with sodium silicate in an aqueous reaction medium having a pH maintained at about 9 to about 10 and at a reaction temperature of about 65° C. to about 75° C., said sodium silicate having an $Na_2O:SiO_2$ ratio of from about 1.0:1 to about 1.2:1.

2. A method for the continuous preparation of magnesium silicate having a $MgO:SiO_2$ ratio of about 1.2:1 to about 1.3:1 which comprises continuously reacting magnesium sulfate with sodium silicate in an aqueous reaction medium having a pH maintained at about 9.3 to 9.6 and at a reaction temperature of about 65° C. to about 75° C., said sodium silicate having an $Na_2O:SiO_2$ ratio of from about 1.0:1 to about 1.2:1.

3. A method for the continuous preparation of magnesium silicate having a $MgO:SiO_2$ ratio of about 1.2:1 to about 1.3:1 of sufficient purity for use in a liquid pharmaceutical composition which comprises, continuously reacting magnesium sulphate with an alkali metal silicate in an aqueous reaction medium maintained at a pH of 9.0 to about 10.0 and at a reaction temperature of about 65° C. to about 75° C., said alkali metal silicate having an $Na_2O:SiO_2$ ratio of from about 1.0:1 to about 1.2:1, continuously filtering the prepared magnesium silicate slurry on a drum filter and washing the filter cake on said drum filter with wash water maintained at a temperature of about 90° C.

4. A method for preparing magnesium silicate having an $MgO:SiO_2$ ratio of about 1.2:1 to about 1.3:1 of sufficient purity for use in a pharmaceutical composition which comprises, interacting magnesium sulphate with an alkali metal silicate in an aqueous reaction medium maintained at a pH of about 9.3 to about 9.6 and at a reaction temperature of about 65° C. to about 75° C., said alkali metal silicate having an $Na_2O:SiO_2$ ratio of about 1.0:1 to about 1.2:1, diluting the resulting slurry prior to filtering, continuously filtering the diluted slurry on a drum filter, washing the filter cake on said drum filter with wash water maintained at a temperature of about 90° C., drying the washed filter cake at a temperature of about 155° C. and pulverizing the dried cake to form powdered magnesium silicate suitable for use in a dry pharmaceutical composition.

References Cited

UNITED STATES PATENTS 2,434,418   1/1948   La Lande _____ 23—110

OTHER REFERENCES

Hinz et al.: Silikat. Technik, vol. 8, 151–156 relied upon (1957).

Soine, T. O., et al.: Rogers Inorganic Pharmaceutical Chemistry (1961), Lea and Febiger, pp. 378–380.

MILTON WEISSMAN, *Primary Examiner.*